US006849568B2

(12) United States Patent
Yan

(10) Patent No.: US 6,849,568 B2
(45) Date of Patent: Feb. 1, 2005

(54) HYDROPHILIC ZEOLITE COATING

(75) Inventor: Yushan Yan, Riverside, CA (US)

(73) Assignee: Honeywell International Inc., Morristown, NJ (US)

( * ) Notice: Subject to any disclaimer, the term of this patent is extended or adjusted under 35 U.S.C. 154(b) by 32 days.

(21) Appl. No.: 10/319,027

(22) Filed: Dec. 12, 2002

(65) Prior Publication Data

US 2003/0091872 A1 May 15, 2003

Related U.S. Application Data

(62) Division of application No. 09/535,000, filed on Mar. 23, 2000, now Pat. No. 6,500,490.

(51) Int. Cl.[7] .................................. B01J 29/06
(52) U.S. Cl. ..................... 502/4; 502/60; 502/62; 502/64; 428/702; 428/704; 428/469
(58) Field of Search ................. 502/4, 60, 62, 502/64, 71, 77; 428/702, 701, 469

(56) References Cited

U.S. PATENT DOCUMENTS

| | | | |
|---|---|---|---|
| 3,989,550 A | | 11/1976 | Newhard |
| 4,699,708 A | * | 10/1987 | Dessau ................ 208/111.15 |
| 4,699,892 A | * | 10/1987 | Suzuki .......................... 502/4 |
| 5,019,263 A | * | 5/1991 | Haag et al. ............. 210/500.25 |
| 5,234,714 A | | 8/1993 | Patel et al. |
| 5,248,643 A | | 9/1993 | Patil et al. |
| 5,258,339 A | * | 11/1993 | Ma et al. ......................... 502/4 |
| 5,264,250 A | | 11/1993 | Steele et al. |
| 5,292,696 A | | 3/1994 | Ito et al. |
| 5,305,827 A | | 4/1994 | Steele et al. |
| 5,310,714 A | * | 5/1994 | Grasselli et al. ............... 502/64 |
| 5,349,117 A | | 9/1994 | Grasselli et al. |
| 5,492,679 A | | 2/1996 | Ament et al. |
| 5,545,438 A | | 8/1996 | Ouyang et al. |
| 5,567,664 A | | 10/1996 | Barri et al. |
| 5,605,631 A | | 2/1997 | Barri et al. |
| 5,824,617 A | | 10/1998 | Lai |
| 5,849,980 A | | 12/1998 | Lai |
| 5,871,650 A | | 2/1999 | Lai et al. |
| 6,033,458 A | | 3/2000 | Goodman et al. |
| 6,037,292 A | * | 3/2000 | Lai et al. ....................... 502/60 |
| 6,140,263 A | * | 10/2000 | Anstett et al. ................... 502/4 |
| 6,193,784 B1 | * | 2/2001 | Yazawa et al. ................. 95/45 |

FOREIGN PATENT DOCUMENTS

| | | |
|---|---|---|
| EP | 288258 A2 | 4/1988 |
| EP | 623653 A2 | 6/1994 |
| EP | 676250 A1 | 7/1995 |
| GB | 2259514 A | 3/1993 |
| GB | 2288178 A | 11/1995 |
| GB | 2295828 A | 12/1996 |
| WO | WO 95/10642 | 4/1995 |
| WO | WO 95/25143 | 9/1995 |
| WO | WO 96/21752 | 7/1996 |
| WO | WO 96/24435 | * 8/1996 |

OTHER PUBLICATIONS

Encyclopedia of Chemical Reactions, vol. 1, p. 48. 1946.*
Kusakabe et al., "Formation of a Y–Type Zeolite Membrane on a Porous α–Alumina Tube for Gas Separation," Ind. Eng. Chem. Res., 1997, pp. 649–655, vol. 36(3).
Mintova et al., "Preparation of ZSM–5 Films from Template Free Precursors", J. Mat. Chem., 1997, pp. 2341–2342, vol. 7(12), Royal Society of Chemistry.
Myatt et al., "Synthesis of a Zeolite NaA Membrane," J. Mater. Chem., 1992, pp. 1103–1104, vol. 2(10), Royal Society of Chemistry.
Yan et al., "Preparation of Zeolite ZSM–5 Membranes by In–Situ Crystallization on Porous α–Al$_2$ O$_3$," Ind. Eng. Chem. Res., 1995, pp. 1652–1661, vol. 34, No. 5, Royal Society of Chemistry.

* cited by examiner

Primary Examiner—Kiley Stoner
Assistant Examiner—Christina Ildebrando
(74) Attorney, Agent, or Firm—Oval Caglar, Esq.

(57) ABSTRACT

A hydrophilic coating can be optionally corrosion resistant and/or microbial resistant for a substrate such as a heat exchanger. The coating is provided by a zeolite layer that can be formed from a synthesis solution comprising a structure directing agent, a base, a silicon source, an aluminum source, and a solvent. In one preferred embodiment, the synthesis solution comprises tetrapropylammonium hydroxide, sodium hydroxide, aluminum oxide, tetraethylorthosilicate, and water. The layer is characterized by a zeolite MFI structure and by a composition having the formula of $M_{n/m}[Al_nSi_{(96-n)}O_{192}]$, or $[Al_nSi_{(96-n)}O_{192}]\cdot 4[(CH_3CH_2CH_2)_4N-OH]$ wherein M is a metal ion of valence $m^+$ (e.g., $Na^+$) and $27 > n >= 0$. After formation of the coating, the organic structure directing agent can be left intact inside the zeolite coating to make the coating corrosion resistant. Alternatively, and after removal of the organic structure directing agent, a biocidal metal ion can be incorporated into the coating by an ion exchange process to render the coating microbial resistant. A hydrophilic coating that is also corrosion resistant and microbial resistant can be made by a zeolite coating with two sub-layers—the bottom sub-layer being corrosion resistant and the top sub-layer being microbial resistant.

25 Claims, 2 Drawing Sheets

HYDROPHILIC ZEOLITE COATING

CROSS REFERENCE TO RELATED APPLICATION

This is a divisional application of U.S. application Ser. No. 09/535,000 filed Mar. 23, 2000, now U.S. Pat. No. 6,500,490.

BACKGROUND OF THE INVENTION

The present invention generally relates to hydrophilic coatings. More specifically, the present invention relates to hydrophilic coatings for heat exchanger surfaces and which coatings can also be anti-microbial and corrosion resistant in nature.

An environmental control system for a manned spacecraft typically includes a condensing heat exchanger for controlling cabin temperature and humidity. Cabin air is drawn into the condensing heat exchanger and circulated through air passageways. Heat drawn from the drawn-in air is transferred to a coolant that is circulated through coolant passageways within the condensing heat exchanger. As the drawn-in air is being cooled, condensate forms on the heat transfer surfaces of the air passageways. Water droplets, if allowed to form, can cause problems in the micro-gravity environment of space. If strongly attached to the heat transfer surfaces, the water droplets may cause an increase in air pressure drop across the condensing heat exchanger and, consequently, a reduction in performance of the condensing heat exchanger. If not strongly attached, the water drops may become entrapped in the air stream and carried into the cabin. In such instance, rain could quite literally fall inside the cabin.

To address the above water condensation concerns, heat exchanger surfaces have usually been coated with a hydrophilic coating to facilitate wetting and wicking, rather than droplet formation. However, since the hydrophilic coating becomes wet during the operation of the condensing heat exchanger, the moisture provides a potential breeding ground for microbes such as bacteria and fungi. Moisture levels between about 15% and 35% will predominantly support the growth of fungi, while moisture levels above about 35% will also predominantly support the growth of bacteria. The microbial growths could block air passages inside the condensing heat exchanger and, consequently, reduce performance of the condensing heat exchanger. The bacteria and fungi, if allowed to proliferate, could also affect the health of crew members inside the cabin.

In addition to hydrophilic and anti-microbial characteristics, coatings on heat exchangers are often required to be corrosion resistant. This is especially important for aluminum heat exchangers that have a high tendency to corrode. Nevertheless, aluminum is still commonly used because it has high heat conductance and is light in weight.

The hydrophilic coatings in the past have typically been formed from a slurry and then sprayed, dipped or painted onto the heat exchanger surface. As an example, in U.S. Pat. Nos. 5,264,250 and 5,305,827, a slurry is made from an inorganic compound (i.e., hydrophilic material), binder and insolubilizer. Optionally, an anti-microbial agent, such as silver oxide, can be added to the slurry during its formation in order to minimize microbe formation. The inorganic compound can include silica and calcium silicate. Prior to the components in the slurry aggregating, the slurry is dipped, sprayed, painted or flowed onto the heat exchanger surface. Thereafter, the slurry coating is dried and subjected to high temperature sintering at about 500° C. WO No. 95/25143 is related to the above. These coatings, however, do not appear to also be corrosion resistant.

Other hydrophilic coatings have been formed by successive solutions that are dipped, sprayed, or painted onto the heat exchanger surface. In U.S. Pat. No. 5,234,714, an aluminum heat exchanger is successively immersed in a cleaning solution, chromate solution, and then silicate solution. The chromium solution includes an activator with chromium trioxide, hydrofluoric acid, and nitric acid. The silicate solution includes silicate of soda and potassium hydroxide. After the solution baths, the heat exchanger is baked at about 415° F. By maintaining precise concentration levels in the solutions, a corrosive resistant, hydrophilic coating is claimed to be produced. While corrosion resistant, no mechanism is described to make the coating anti-microbial.

Another example of successive solution applications is U.S. Pat. No. 3,989,550. An aluminum surface is first etched and then treated with a first solution of active fluoride, chromate ions, and phosphate ions. A second solution includes an alkali metal silicate composed of silicon dioxide and an alkali metal oxide. The latter is preferably sodium or potassium oxide. After the two solution applications, the coated surface is baked preferably at about 350° F. This coating appears to be corrosive resistant but not anti-microbial.

Due to the belief that coatings containing silicates cause excessive wear on tooling due to ion exchange resin particles or boehmite, EP No. 88303545.3 teaches an aluminum surface having a hydrophilic coating comprised of slurry of activated alumina and an organic binder resin. The resin can be an acrylic, polyester or epoxy. Optionally, the slurry coating can be blended with dispersion stabilizers, catalysts, plasticizers, and cross-linking agents. As with the above techniques, the slurry coating in EP No. 88303545.3 can be applied by dipping, spraying, or brushing individual components prior to assembly. However, such pre-coating methodology tends to have a negative impact on process efficiency since components are first coated and then assembled, as opposed to coating an assembled apparatus.

Additional examples of hydrophilic coatings on heat exchanger surfaces are found in U.S. Pat. No. 5,545,438; EP Nos. 676,250 and 623,653; WO Nos. 96/21752 and 95/10642; and UK Nos. 2,295,828; 2,288,178; and 2,259,514.

Notwithstanding the advantages provided in the above prior art, disadvantages still remain. In terms of making and applying the hydrophilic coating, it can be seen that multiple steps and multiple components (i.e., hydrophilic material, binder, plasticizer, etc.) are required. Yet, there is little synergetic effect. Consequently, compromises have to be made, resulting in non-optimal properties with respect to adhesion, heat conductivity, and service life. Also, the formation of a slurry and/or the use of a pre-assembly dip-coating type technique (i.e., dipping, spraying, painting, brushing) restricts the scope of application. In other words, the ability to coat heat exchanger substrates with small fin sizes and/or complex configurations becomes restricted. For example, the smaller the fin size, the more difficult it is for a slurry to provide a thin coating. Likewise, the more complex the configuration, the more difficult it is to spray or paint the substrate.

Another significant disadvantage in the prior art relates to how the anti-microbial characteristic is employed. For example, even though silver oxide is typically employed, it is intrinsically hydrophobic. When the concentration of the silver oxide exceeds about 1.5% of the total weight of the hydrophilic coating, it is believed that the hydrophilicity is reduced. Thus, increasing the amount of silver oxide increases the likelihood of droplets forming inside the air passageways of the heat exchanger. On the other hand, decreasing the amount of anti-microbial agent is thought to allow the agent to dissolve out of the coating too quickly, thereby causing pitting in the coating. In turn, hydrophilicity, structural integrity, and heat transfer efficiency are reduced. Furthermore, after the anti-microbial agent has completely dissolved, the anti-microbial characteristic cannot be regenerated in the absence of re-coating. Yet another limitation is that only a limited amount of an anti-microbial agent can be used without compromising the processibility of the slurry, the hydrophilicity, and heat transfer properties. An example of an anti-microbial and hydrophilic coating is found in U.S. patent application Ser. No. 60/041,129, which is also assigned to the assignee herein.

As can be seen, there is a need for an improved hydrophilic coating and method of making the same. In particular, an improved hydrophilic coating is needed that is also corrosion and/or microbial resistant. A hydrophilic coating is needed that can be used on heat exchanger substrates that are small in fin size and/or of a complex shape. An ability to regenerate the anti-microbial effects in a hydrophilic coating is also needed. A method of making an improved hydrophilic coating is needed to eliminate the need for multiple types of components in the coating which provide little synergistic effect. Also needed is an improved method that can eliminate the need for multiple steps to produce the coating.

SUMMARY OF THE INVENTION

According to the present invention, a hydrophilic coating that is optionally corrosion and/or microbial resistant for a substrate comprises a zeolite layer adhered to the substrate, with the layer being produced from a synthesis solution. Also provided by the present invention is a method of making a hydrophilic coating that is optionally corrosion and/or microbial resistant for a substrate, and comprises the steps of preparing a synthesis solution; placing the synthesis solution in contact with the substrate; and forming a zeolite layer on the substrate. The zeolite layer can additionally undergo calcination and ion exchange to create an antimicrobial character.

These and other features, aspects and advantages of the present invention will become better understood with reference to the following drawings, description and claims.

DETAILED DESCRIPTION OF THE INVENTION

Figure 1:
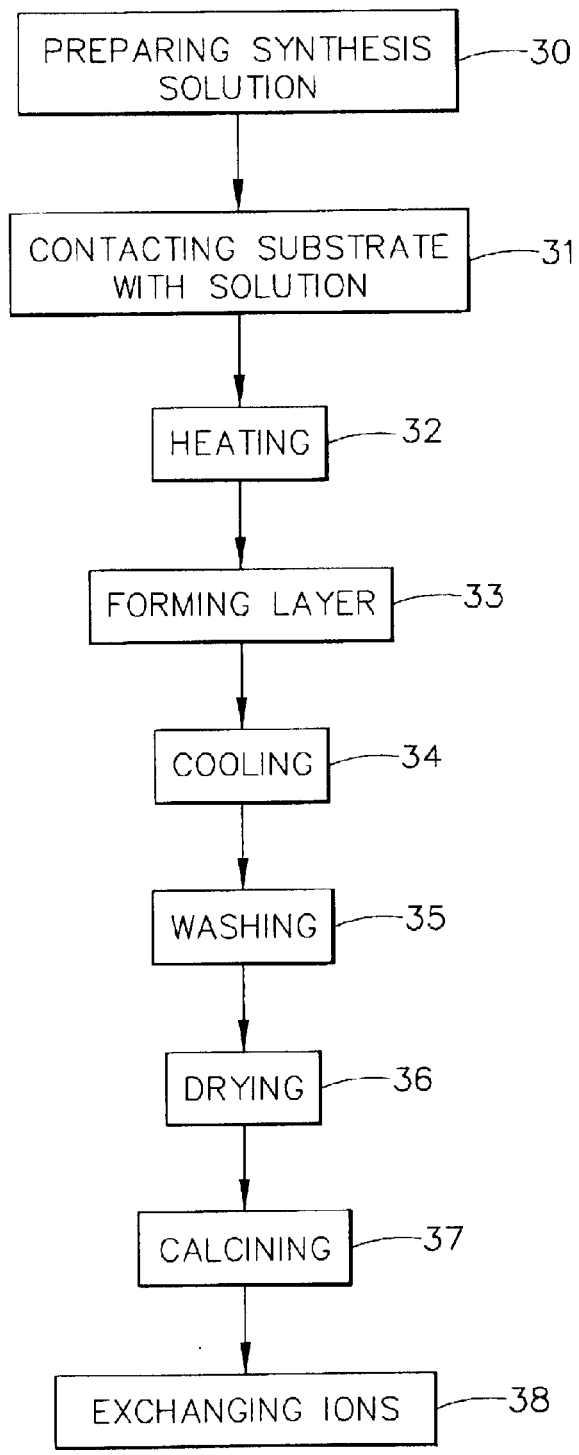
FIG. 1 is a flowchart of the steps or acts of one preferred method of making a hydrophilic coating according to the present invention.
Figure 2:
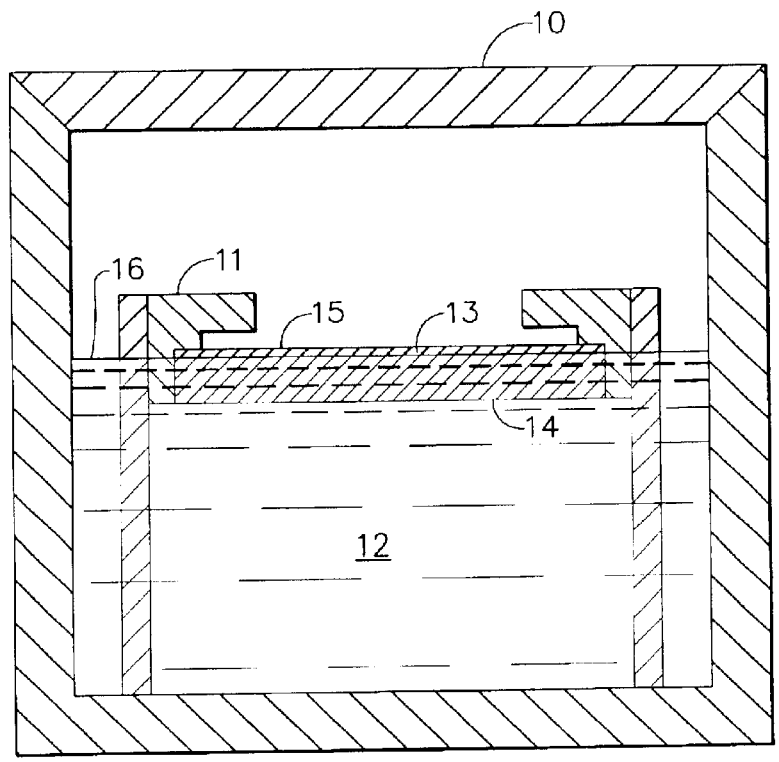
FIG. 2 is schematic diagram of a substrate being coated with a hydrophilic coating according to one preferred method of the present invention.
Figure 3:
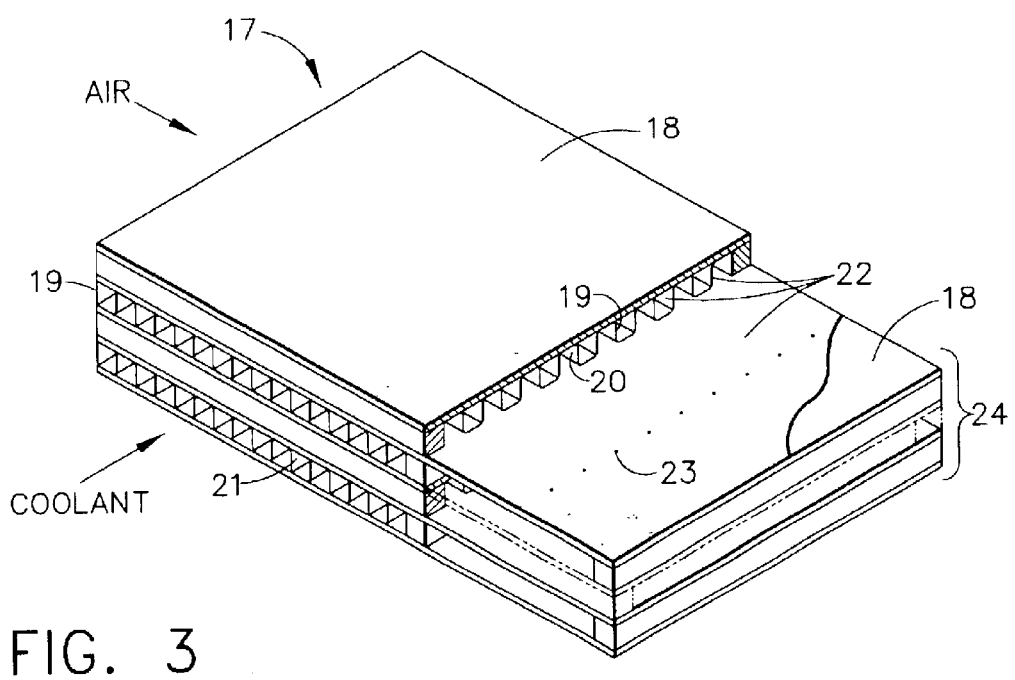
FIG. 3 is a perspective view of a heat exchanger having a hydrophilic coating according to one preferred embodiment of the present invention.

As seen in FIG. 1, the steps or acts of making a hydrophilic coating that is optionally corrosion and/or microbial resistant according to one embodiment of the present invention are shown. One embodiment of such steps or acts according to the present invention is also depicted in FIG. 2. Therein, a substrate 13 is shown in contact with a synthesis solution 12. Consequently, and as a result of in-situ crystallization, a hydrophilic coating 22 (not shown) is formed on a layering surface 14 of the substrate 13. The present invention contemplates that a preferred composition of the coating 22 is a zeolite, while a preferred structure is MFI. For purposes of example, the hydrophilic coating 22 is shown in FIG. 3 on various surfaces of a condensing heat exchanger 17.

Although the present invention has particular utility in the context of condensing heat exchangers, the scope of the present invention is not so limited. Rather, the present invention contemplates that the hydrophilic coating 22 may be applied to various types of apparatus that generally benefit from having a hydrophilic character, including evaporators. Additionally, while the present invention may be particularly useful in the context of spacecraft, the invention is not so limited and may also be useful for other environments, such as terrestrial vehicles.

As noted above, the present invention preferably utilizes zeolites to form the hydrophilic coating 22. Even though some zeolites have been known to have hydrophilic characteristics, they have typically been used in catalysis, as well as in gas separation and purification. Zeolites, together with their application and synthesis, are generally described in D. Breck "Zeolite Molecular Sieves—Structure, Chemistry, and Use" Wiley, 1974; Kusakabe et al., "Formation of a Y Type Zeolite Membrane on a Porous α Alumina Tube for Gas Separation," Ind. Eng. Chem. Res. 1997, 36(3) 649–655; and Myatt et al., "Synthesis of a Zeolite NaA Membrane," J. Mater. Chem., 1992, 2(10), 1103–1104. Notwithstanding the extensive published literature, the literature does not appear to suggest that a particular zeolite (or even zeolites in general) can or should be used as a coating that is hydrophilic and/or corrosion resistant and/or microbial resistant. Therefore, the advantages achieved by the use of a zeolite according to the present invention were unexpected and surprising.

In more particularly describing how a zeolite is utilized in the steps or acts according to a preferred embodiment of the present invention, FIG. 1 depicts an initial preparing step or act 30. In the preparing step 30, the synthesis solution 12 is prepared. The synthesis steps for preparing the solution 12, in general, follow the synthesis steps described in Yan et al., "Preparation of Zeolite ZSM-5 Membranes by In-Situ Crystallization on Porous α-$Al_2O_3$," Ind. Eng. Chem. Res. 1995, 34, 1652–1661. The synthesis solution 12 can vary depending upon the particular zeolite desired. In general, the synthesis solution 12 includes a structure directing agent, a base, an aluminum source, a silicon source, and a solvent. Metals other than aluminum are possible, but probably rare. The structure directing agent, in essence, acts as a template for the particular crystalline structure to be formed, as described below. The silicon and aluminum sources provide the building materials for the zeolite to be formed.

In this particular embodiment, the synthesis solution 12 comprises a mixture preferably of tetrapropylammonium hydroxide (TPAOH), sodium hydroxide (NaOH), aluminum oxide ($Al_2O_3$), tetraethylorthosilicate (TEOS), and water ($H_2O$). The TPAOH serves as the structure directing agent, the NaOH serves as the base, the TEOS serves as the silicon source, the aluminum oxide serves as the aluminum source, and the water serves as the solvent. However, various substitute components can be used for the above. As an example, instead of using TPAOH, substitutes can include tetraethylammonium hydroxide; diethylamine; dimethylethylpropylammonium hydroxide; tripropylamine; triethylpropylammonium hydroxide; 1,6 hexanediol; hexane 1,6-diamine; and pyrrolidine. Useful substitutes for the silicon source include sodium silicate, fumed silica (such as Cab-O-Sil manufactured by Cabot), and colloidal silica (such as Ludox manufactured by du Pont). Instead of aluminum oxide, sodium aluminate or aluminum alkoxide can be used.

While the relative amounts of the constituents can vary, the preferred constituents are preferably used in the approximate molar ratios of about (76–265) TPAOH, (520–680) NaOH, (0–2.4) $Al_2O_3$, 1000 TEOS, and (69,100–95,100) $H_2O$. More preferably, the molar ratios are about 169 TPAOH, 577 NaOH, 0.83 $Al_2O_3$, 1000 TEOS, and 94,656 $H_2O$. With a molar ratio for TPAOH above or below about 76–265, the coating 22 tends to be rough, uneven or discontinuous. A molar ratio for NaOH above or below about 520–680 tends to cause the coating 22 to be discontinuous or thick and flaky. With an aluminum oxide molar ratio in excess of about 2.4, then precipitation may occur in the synthesis solution 12. For molar ratios above or below about 69,100–95,100 for water, the coating 22 tends to become discontinuous or uneven.

For a synthesis solution 12 without an aluminum source, measured amounts of TPAOH and NaOH are first added to measured amounts of deionized water, and then stirred. A measured amount of TEOS is then added dropwise while stirring. Initially, the solution may appear turbid. But with continued stirring, the solution becomes clear. For a synthesis solution using an aluminum source, an aluminum foil can be employed and first dissolved in a 50 wt. % aqueous solution of NaOH. Then the required amount of TPAOH and the balance of water is added. After being stirred for a few minutes, a measured amount of TEOS is added dropwise while stirring. The resulting synthesis solution 12 is characterized by being substantially clear with low viscosity. It is substantially not in the form of a gel or slurry.

After the preparing step 30, a contacting step or act 31 occurs. As shown in FIG. 2, the contacting step 31 includes placing the substrate 13 in contact with the synthesis solution 12. While the substrate 13 composition can vary, the present invention contemplates that the coating 22 can be particularly useful for aluminum, cobalt-iron alloy, nickel, stainless steel, and titanium. Additionally, while the substrate 13 need not necessarily be pre-treated for the coating 22 to adhere, it has been found that better adhesion is achieved for nickel and stainless steel that have been air oxidized. Irrespective of the substrate 13 material and/or pre-treatment, in carrying out the contacting step 31, the synthesis solution 12 is placed in a reaction vessel 10, as shown in FIG. 2.

The vessel 10 can be of various constructions that enable it to be sealed and heated. Additionally, the vessel 10 should enable the layering surface 14 to be coated to remain in contact with the synthesis solution 12 during the formation of the coating 22. For example, the vessel 10 can be a Teflon lined Parr autoclave. Within the vessel 10 is a substrate holder 11 that can fixedly hold the substrate 13 in a horizontal position. However, the present invention contemplates that the orientation of the substrate 13 can also be vertical. So positioned, the layering surface 14 of the substrate 13 is in contact with the synthesis solution 12. At the same time, and in this particular embodiment, a non-layering surface 15 of the substrate 13 is disposed above a solution level 16. Thereby, the non-layering surface 15 is out of contact with the synthesis solution 12. In so doing, the non-layering surface 15 is not provided with the coating 22, while the layering surface 14 will have such coating 22.

Nevertheless, the present invention contemplates that the surfaces 14, 15 can both have a coating 22 if desired.

While FIG. 2 only depicts a single component or substrate 13 being coated, the present invention envisions that multiple components that have been assembled into a final product, such as a heat exchanger, can be subjected to the coating process of the present invention. Such a post-treatment method or process eliminates tooling concerns that otherwise exist in prior art methods, such as the coating abrading the tooling. Also, since the coating is being applied after the components are assembled, the concern about damage to a component during assembly, such as the fin of a heat exchanger, is eliminated. Further, the coating method according to the present invention allows only certain surfaces of an assembly to be coated, even when the assembly is of a complex shape. As an example, if only the air side of a heat exchanger needs to be coated, then the exchanger and synthesis solution can be arranged so that only the air side is in solution.

After the contacting step 31, a forming step or act 33 occurs. At this time, the vessel 10 is sealed closed and then heated to a synthesis temperature. In general, the synthesis temperature is dictated by that which is sufficient to allow "in-situ crystallization" of the synthesis solution 12 onto the layering surface 14. The term "in-situ crystallization" is intended to mean a process by which crystals in the coating 22 are formed directly from the synthesis solution 12 which does not contain any preformed crystals. In other words, and in contrast to the prior art, the present invention omits typical intermediate steps, such as grinding of the active ingredient particles (e.g., zeolite particles if zeolites were to be used) and mixing the ground particles with a binder to produce a slurry. The present invention also omits the typical steps of dipping, or spinning or spraying, painting or brushing the slurry onto the surface to be coated. Instead, the in-situ crystallization technique employed in the present invention includes a substantially dear synthesis solution 12 made only with the active ingredients. The solution 12 is then placed in contact with the substrate 13 to directly produce a coating 22 in the form of a crystalline structure further described below.

In practicing the present invention, the forming step 33 can occur by conventional means, such as placing the vessel 10 into a constant temperature oven that has been preheated to the synthesis temperature. The synthesis temperature will tend to vary depending upon the zeolite type desired, the specific composition of the synthesis solution 12, the reaction time, and the thickness of the coating 22. For this particular embodiment and with a coating 22 thickness of about 7–10 microns, the synthesis temperature is preferably about 135 to 200° C. More preferably, the synthesis temperature is about 165 to 185° C., and most preferably about 175° C. A low synthesis temperature is typically desired from a process point of view since lower temperature means lower pressure generated inside the reaction vessel 10. But as synthesis temperature decreases, it generally takes longer to form a coating 22 with a desired thickness. Below about 135° C., the coating 22 may not formed with a reasonable reaction time.

During the forming step 33, the synthesis temperature is held at a reaction time to allow in situ crystallization to occur, i.e., formation of the coating 22. As with the synthesis temperature, the reaction time can vary, depending upon factors such as the desired zeolite type, the synthesis temperature and coating 22 thickness. However, in the preferred embodiment, the reaction time is from about 3 to 36 hours. More preferably, the reaction time is from about 6 to 20 hours, while it is most preferable at about 15 hours. Above a reaction time of about 36 hours, the coating 22 tends to be thick and roughened, while below about 3 hours, the coating 22 tends to be discontinuous.

The pH of the synthesis solution 12 is preferably around neutral so that the amount of etching during the synthesis of the coating 22 is minimized. In this preferred embodiment and for the type of substrates 13 mentioned above, the pH is about 11–12. The synthesis reaction occurs under autogenous pressure, i.e., whatever pressure is generated with the particular synthesis solution 12. For the present embodiment, the pressure is close to the saturated water vapor pressure. For a temperature at 175° C., the pressure is about 7 atmospheres.

As already described, the coating 22 formed during the forming step 33 comprises a zeolite layer (i.e., a crystalline aluminosilicate layer). The crystalline structure of the zeolite layer is preferably in the form defined as zeolite MFI. The MFI structure is well known and generally described, for example, in W. M. Meier and D. H. Olson, "Atlas of Zeolite Structure Types," Third edition, Butterworth-Heinemann, 1992. Notwithstanding the preferred MFI structure, other structures can also be used. Some useful structures include zeolite A, zeolite X, zeolite Y, zeolite Omega, sodalite, ferrierite, and mordenite. As known in the art, a particular zeolite structure can be obtained by altering the components/concentrations in the synthesis solution 12.

The composition of the zeolite layer or coating 22 in this particular embodiment can be generally described by one of two formulas which are dependent upon whether the coating 22 additionally undergoes a calcining step 37 and an ion exchanging step 38 further described below. In the absence of the calcining and ion exchanging steps 37, 38, the composition formula for the coating is $[Al_nSi_{(96-n)}O_{192}].4[(CH_3CH_2CH_2)_4N—OH]$. In the presence of the calcining and ion exchanging steps 37, 38, the formula is $M_{n/m}[Al_nSi_{(96-n)}O_{192}]$. In either formula, m is a cation of valence $m^+$ (e.g., $Na^+$) and $27>>=0$. The exact number for n is unknown. Nevertheless, according to electron probe microanalysis (EPMA) and x-ray photoelectron spectroscopy (XPS), n changes in the direction vertical to the substrate 13. It appears that, at least for an aluminum substrate 13, n decreases with increasing distance from the substrate 13.

The thickness of the coating 22 can vary depending upon, among other things the particular application and the particular zeolite used. For heat exchanger applications, the coating 22 thickness should be minimized to facilitate heat conduction. For a continuous zeolite coating 22, the hydrophilicty in general does not depend on the thickness, while the microbial and corrosion resistant characteristics do. In terms of microbial resistance for a given zeolite, a thicker coating 22 generally means that more biocidal agent can be loaded into the coating 22. And this, in turn, gives a longer service life if the microbial growth is a limiting factor for service life. In terms of corrosion resistance for a given zeolite, a critical feature is the continuity of the coating. For a desirable continuity, all the zeolite crystals should be well interconnected with each other so that the substrate surface 14 is completely covered by the zeolite. It appears, however, there is a minimum thickness required for corrosion resistance. For heat exchangers, the thickness can range from several microns to several tens of microns. Preferably, and for a heat exchanger, the thickness of the coating 22 ranges from about 7–10 microns.

It is believed that the coating 22 is adhered to the substrate 13 by condensation reactions between hydroxyl groups on the surface of the zeolite crystals in the coating 22 and on the surface of the substrate 13. The reactions are thought to form M—O—Si (Al) bonds. Accordingly, the present invention may not perform as well on substrates that do not have or do not produce hydroxyl groups during the forming step 33 and/or are unstable under the synthesis conditions. Thus, certain polymers, such as polyethylene and polypropylene, may not be a highly desired material for the substrate 13. It is also believed that when the preferred synthesis solution 12 having aluminum is used with a substrate 13 made of aluminum, the aluminum in the substrate 13 tends to be incorporated into the framework of the coating 22. Thereby, the coating 22 and substrate 13 are strongly adhered to each other. This adherence characteristic is evidenced by the fact that when the preferred synthesis solution 12 is used with an aluminum-based substrate 13, as opposed to another metal based-substrate 13, the aluminum concentration in the coating 22 tends to decrease as the distance from the coating/substrate interface increases.

After the forming step 33, a cooling step or act 34 takes place. The vessel 10 is removed from the oven or other heat source and cooled to room temperature. The cooling can occur by quenching the vessel 10 in water. Upon cooling, the coated substrate 13 is removed from the vessel 10 and subjected to a washing step or act 35. The substrate 13 can be washed with water to remove any remaining, unreacted synthesis solution 12. Next, the washed substrate 13 undergoes a drying step or act 36. The drying can be accomplished by leaving the substrate 13 in air at ambient temperature and/or placing the substrate 13 at an elevated temperature, such as about 110° C.

Upon completion of the drying step 36, the coating 22 is both hydrophilic and corrosion resistant. The corrosion resistant character is based upon the fact that certain zeolites are, by their very nature, corrosion resistant. Perhaps more importantly, the zeolite channels or holes that are normally available for mass transport are blocked by the structure directing agent used in the synthesis solution 12. In other words, these channels or holes normally provide a means for air and other contaminants to pass through a zeolite. But the presence of the structure directing agent makes the coating 22, in effect, "gas tight." Therefore, the coating 22 protects the substrate 13 from corrosives that could otherwise move through the zeolite channels and to the substrate 13.

After the drying step 36, the coating 22 can then be used, as is, for providing hydrophilicity and corrosion resistance. If, however, it is desired to make the coating microbial resistance (but not corrosion resistance), the coated substrate 13 can then undergo the calcining step 38. Calcining can occur in air at about 500° C. for about 13 hours in this embodiment. The calcining step 38 is intended to free the zeolite coating 22 of the trapped organic, structure directing agent and its decomposition products. Since the structure directing agent is removed during the calcining step 38, it can be appreciated by those skilled in the art that the coating 22 retains its hydrophilicity but loses its corrosion resistance.

After the calcining step 38, the coating 22 can be loaded with biocidal ions through the ion exchanging step 38 to render the coating 22 microbial resistant. As is known, the MFI structure has the ability for ion exchange. Accordingly, the present invention can use such ion exchange ability to exchange of one or more than one type of biocidal ions with ions in the zeolite coating 22. Silver is one example of a biocidal ion that can act as an anti-microbial agent. The manner in which the ion exchange can be accomplished is by any conventional means, such as by immersion in a salt solution and described in D. Breck "Zeolite Molecular Sieves—Structure, Chemistry, and Use," Wiley, 1974, pp. 529–588.

As seen from the above, the coating 22 can have, in addition to a hydrophilic character, a corrosion resistant character or a microbial resistant character, but not both. Still, if it is desired to have both a corrosion resistant and microbial resistant character, the coating 22 can then be formed with a plurality of sub-coatings. For example, a second sub-coating can be formed over a first sub-coating 22. In such instance, the first sub-coating is formed as described above for a single coating and ending the process at the completion of the drying step 36. The second sub-coating is formed in the same manner as the first sub-coating but modified with the addition of the calcining and ion exchanging steps 37, 38. Thereby, the first sub-coating provides hydrophilicity and corrosion resistance, while the second sub-coating provides hydrophilicity and microbial resistance.

An alternative means for providing both corrosion resistance and microbial resistance, and perhaps more preferably than above, is to make the second sub-coating from a synthesis solution 12 that omits the structure directing agent. Even though the structure directing agent is omitted, it can be appreciated that the MFI structure can be maintained in the second sub-layer by altering the composition of the synthesis solution 12, such as by the method described in S. Mintova et al. "Preparation of ZSM-5 Films from Template Free Precursors", J. Mat. Chem. 1997, 7(12) 2341–2342, and incorporated herein by reference. The second sub-coating can then undergo the ion exchanging step 38 without the calcining step 37. If calcination occurred after the second sub-coating was applied, the organic in both the first sub-coating and second sub-coating would be destroyed. And the organic in the first sub-coating is needed for corrosion resistance.

With the alternative above, a processing step is omitted and a saving in time is achieved. It can also be appreciated that since the anti-microbial agent is added after the second sub-coating is formed, a concern about the anti-microbial agent diminishing in effect through its dissolution from the second sub-coating is minimized. This is because the anti-microbial agent can be re-added to the second sub-coating on multiple occasions. Therefore, the coating 22 can be considered regenerable in terms of its anti-microbial nature.

As an example of how the coating 22 can be utilized, FIG. 3 depicts a typically designed heat exchanger 17 but with the coating 22 of the present invention. The exchanger 17 includes a plurality of plates of substrates 18 with a plurality of fins 19 therebetween. The combination of plates 18 and fins 19 provide air passageways 20 and coolant passageways 21. A plurality of orifices 23 make up a slurper section 24 that allows condensate on the air side to be pulled through and collected. The coating 22 is shown as covering the plates 18 and the fins 20.

EXAMPLES

Samples of aluminum alloy 6000 series, stainless steel 347, and nickel were tested. Most of the samples were 1×3" coupons and the autoclaves used were Parr 45 mL bombs. For the synthesis solution, TEOS (98% liquid), aluminum foil (99.98%), NaOH (50 wt. %), and TPAOH (1M solution) were obtained from Aldrich. Deionized water was also used.

Various synthesis solutions were tested and the following is one preferred solution in which aluminum was included. Aluminum foil (0.0035 grams) was dissolved into 3.6 grams of a 50 wt. % aqueous solution of NaOH. TPAOH (13.35 grams) and water (121.02 grams) were added. The solution was then stirred for 10 minutes and then 16.25 grams of TEOS was added dropwise while stirring. The solution became clear after about 1.5 hours and was further stirred for 4 hours to provide the final synthesis solution.

The synthesis solution was placed into a Teflon lined Parr autoclave and each of the three samples was separately inserted into the autoclave. The substrate was placed in the autoclave vertically and the synthesis solution was at a level about 2 mm above the substrate height. The autoclave was then sealed and placed into a convection oven set at a synthesis temperature of 175° C. for 15 hours without stirring. The pressure inside the autolcave was autogenous and equal to the equilibrium vapor pressure of the synthesis solution. After 15 hours, the autoclave was removed from the oven and quenched with water. Following cooling to room temperature, the samples were removed from the autoclave, washed with water, and then air dried at ambient temperature at 110° C. for 12 hours to give a hydrophilic corrosion resistant coating. Next, the samples were calcined in air at 500° C. to remove the trapped organic structure directing agent and then ion exchanged with a biocidal ion to make the coating anti-microbial.

Table 1 below shows the test results on the three samples. Contact angles were determined by surface tension measurement, while the salt-fog testing was carried out according to ASTM B 117 method.

TABLE 1

| Substrate | Hydrophilicity | Corrosion Resistance | Adhesion | Heat Transfer Efficiency |
|---|---|---|---|---|
| Aluminum | 15° advancing angle 0° receding angle | No corrosion | 5B | Not tested |
| Stainless | 15° advancing angle 0° receding angle | N/A | 5B | 15–30% improvement |
| Nickel | 15° advancing angle 0° receding angle | N/A | 5B | |

A 0 to 35° advancing angle is generally considered to be indicative of hydrophilicity. Accordingly, the 15° advancing angle in the tested samples indicates hydrophilicity. Likewise, a 0 to 35° receding angle is generally considered to be indicative of hydrophilicity. Accordingly, the 0° receding angle in the tested samples indicates high hydrophilicity.

It can be appreciated by those skilled in the art the present invention provides an improved hydrophilic coating and method of making the same. A hydrophilic coating is provided for use on a wide variety of objects made of various materials, but particularly on objects such as heat exchangers that are of a complex shape and have fins of small size. In particular, an improved hydrophilic coating is provided that can optionally be corrosion and/or microbial resistant. The present invention also provides a hydrophilic coating with an ability to regenerate its anti-microbial effects. A method of making an improved hydrophilic coating is provided by the present invention that eliminates the need for multiple types of components in the coating which provide little synergetic effect. For example, the need for a binder and insolubilizer is eliminated. Also eliminated by the present invention is the need for many steps to produce the coating. Among other things, the need for high temperature sintering is eliminated. Additionally, the present method can be tailored to achieve excellent adhesion for a variety of substrates, while the previously used dip coating type technique oftentimes requires a whole new procedure with a change in substrate.

It should be understood, of course, that the foregoing relates to preferred embodiments of the invention and that modifications may be made without departing from the spirit and scope of the invention as set forth in the following claims.

I claim:

1. A hydrophilic coating that can be optionally corrosion resistant or microbial resistant for a substrate, comprising:
a polycrystalline zeolite layer adhered to said substrate, said layer being produced by in-situ crystallization of a synthesis solution and said layer being characterized by a MFI structure, wherein said substrate is part of a condensing heat exchanger.

2. The coating of claim 1, wherein said substrate comprises aluminum, and wherein said aluminum from said substrate is incorporated into a framework of said coating.

3. The coating of claim 1, wherein said coating is both corrosion resistant and microbial resistant.

4. A hydrophilic coating that is also corrosion resistant and microbial resistant for a substrate, comprising:
a first zeolite sub-layer adhered to said substrate, said first sub-layer being produced by in-situ crystallization; and
a second zeolite sub-layer adhered to said first sub-layer, said second sub-layer being produced by in-situ crystallization.

5. The coating of claim 4, wherein said first and second sub-layers are characterized by a MFI structure.

6. The coating of claim 4, wherein said first sub-layer comprises a composition having a formula $[Al_nSi_{(96-n)}O_{192}] \cdot 4[(CH_3CH_2CH_2)_4N{-}OH]$ wherein $27>n>=0$.

7. The coating of claim 4, wherein said second sub-layer comprises a composition having a formula of $M_{n/m}[Al_nSi_{(96-n)}O_{192}]$, wherein M is a biocidal ion of valence $m^+$ and $27>n>=0$.

8. The coating of claim 4, wherein said substrate is part of a condensing heat exchanger.

9. A hydrophilic coating for a substrate, comprising:
a first polycrystalline zeolite layer on said substrate, said first layer having a formula $[Al_nSi_{(96-n)}O_{192}] \cdot 4[(CH_3CH_2CH_2)_4N{-}OH]$ wherein $27>n>=0$; and
a second polycrystalline zeolite layer on said first layer, said second layer having a formula $M_{n/m}[Al_nSi_{(96-n)}O_{192}]$ wherein M is a biocidal metal ion of valence $m^+$.

10. The coating of claim 9, wherein said substrate comprises a condensing heat exchanger, and wherein at least one of said first polycrystalline zeolite layer and said second polycrystalline zeolite layer has an MFI structure.

11. The coating of claim 10, wherein said hydrophilic coating includes corrosion resistance properties and microbial resistance properties.

12. A hydrophilic coating for a substrate, comprising:
a first zeolite layer on said substrate, said first zeolite layer including an organic component; and
a second zeolite layer on said first zeolite layer, said second zeolite layer having a formula $M_{n/m}[Al_nSi_{(96-n)}O_{192}]$, wherein M is a biocidal metal ion of valence $m^+$, and wherein $27>n>=0$.

13. The coating of claim 12, wherein said first zeolite layer has a formula of $[Al_nSi_{(96-n)}O_{192}] \cdot 4[(CH_3CH_2CH_2)_4N{-}OH]$.

14. The coating of claim 12, wherein said organic component imparts corrosion resistance to said first zeolite layer, and wherein said second zeolite layer imparts microbial resistance to said hydrophilic coating.

15. The coating of claim 12, wherein both said first zeolite layer and said second zeolite layer are formed in the absence of a calcining step.

16. The coating of claim 12, wherein said first zeolite layer is formed by in situ crystallization of a first synthesis solution which comprises a structure directing agent, and wherein said second zeolite layer is formed by in situ crystallization of a second synthesis solution which lacks a structure directing agent.

17. The coating of claim 16, wherein said first synthesis solution further comprises a base, an aluminum source, a silicon source, and a solvent, and wherein said structure directing agent is selected from the group consisting of tetrapropylammonium hydroxide; tetraethylammonium hydroxide; diethylamine; dimethylethylpropylammonium hydroxide; tripropylamine; triethyipropylammonium hydroxide; 1,6 hexanediol; hexane 1,6-diamine; and pyrrolidine.

18. The coating of claim 16, wherein said first synthesis solution comprises tetrapropylammonium hydroxide, sodium hydroxide, aluminum oxide, tetraethylorthosilicate, and water in molar ratios of about 169:577:0.83:1,000:94,656, respectively, and wherein said second synthesis solution comprises sodium hydroxide, aluminum oxide, tetraethylorthosilicate, and water in molar ratios of about 577:0.83:1,000:94,656, respectively.

19. The coating of claim 12, wherein at least one of said first zeolite layer and said second zeolite layer has an MFI structure.

20. The coating of claim 12, wherein said hydrophilic coating has a thickness in the range of from about 7 to 10 microns.

21. The coating of claim 12, wherein said substrate comprises a material selected from the group consisting of aluminum, cobalt-iron alloy, nickel, stainless steel, and titanium.

22. The coating of claim 21, wherein said substrate comprises a condensing heat exchanger.

23. A coated component, comprising:
a metal substrate; and
a multi-layered hydrophilic coating disposed on a surface of said substrate, wherein said multi-layered hydrophilic coating comprises:
a first zeolite layer disposed on said substrate, wherein said first zeolite layer comprises an organic component; and
a second zeolite layer disposed on said first zeolite layer, wherein said second zeolite layer has a formula $M_{n/m}[Al_nSi_{(96-n)}O_{192}]$, wherein M is a biocidal metal ion of valence $m^+$, and wherein $27>n>=0$.

24. The coated component of claim 23, wherein said substrate comprises a corrosion resistant and microbial resistant heat exchanger.

25. The coated component of claim 23, wherein said first zeolite layer has a formula of $[Al_nSi_{(96-n)}O_{192}] \cdot 4[(CH_3CH_2CH_2)_4N{-}OH]$, and wherein said first zeolite layer is bonded to said substrate.

* * * * *